April 9, 1963  R. W. HIPPEN  3,085,068
METHOD OF RESOLVING EMULSIONS
Filed Jan. 22, 1958  2 Sheets-Sheet 1
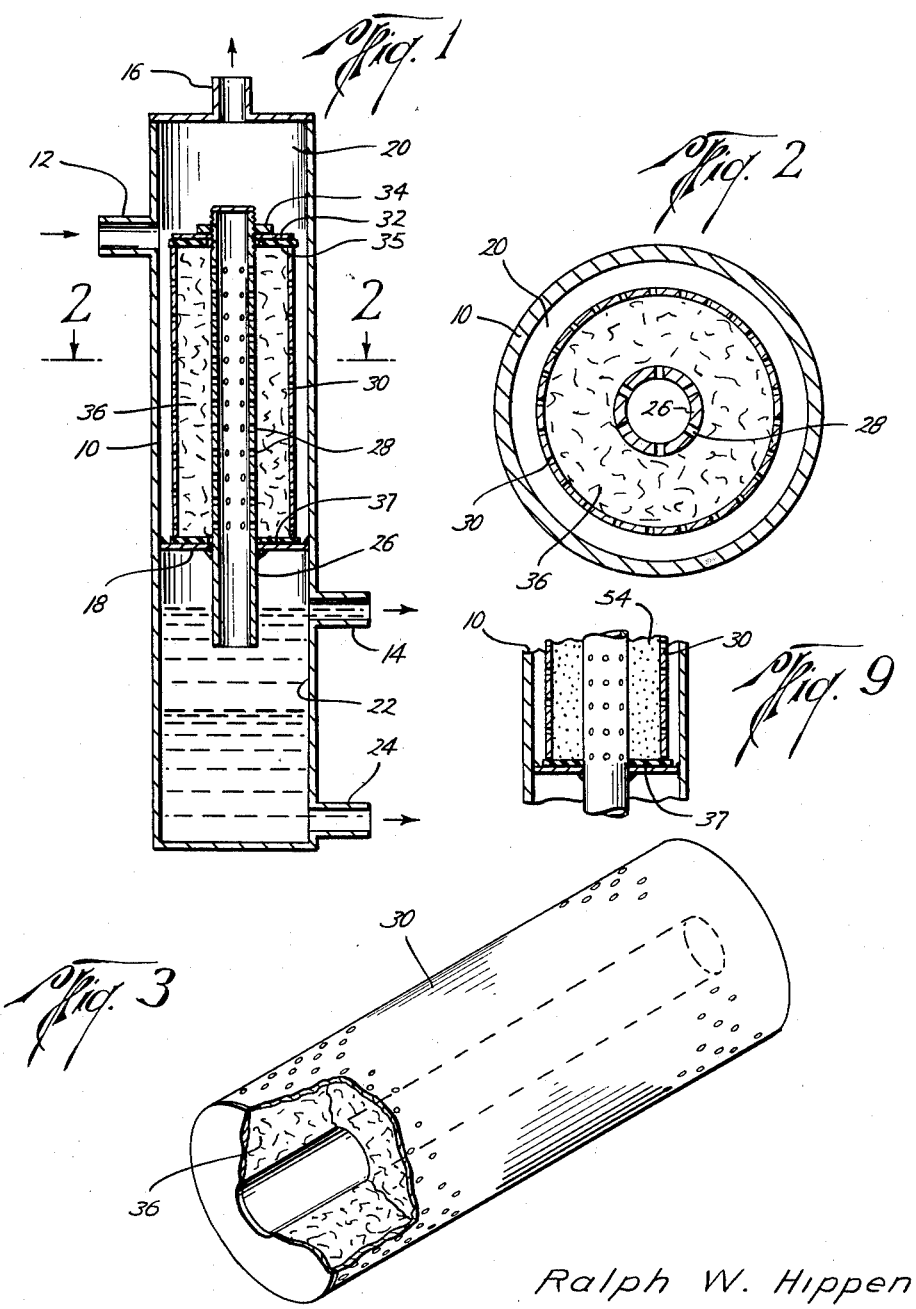
Ralph W. Hippen
INVENTOR.
BY Charles E. Lightfoot
ATTORNEY April 9, 1963  R. W. HIPPEN  3,085,068
METHOD OF RESOLVING EMULSIONS
Filed Jan. 22, 1958  2 Sheets-Sheet 2
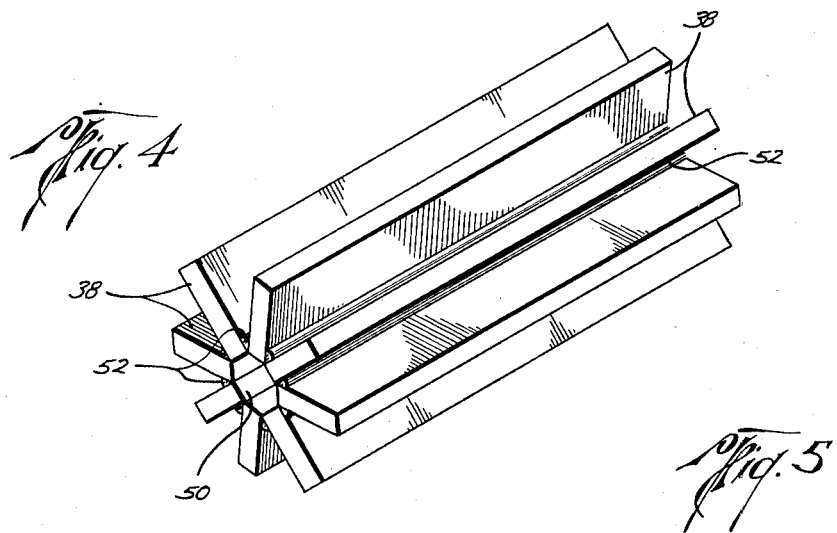
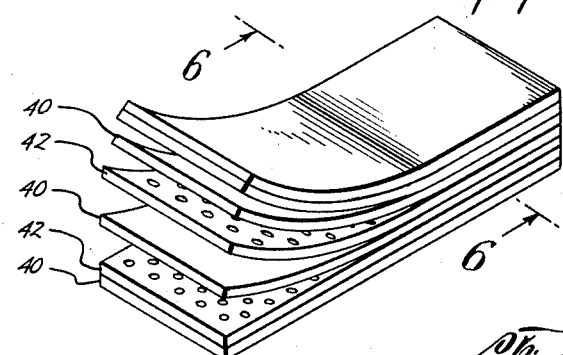
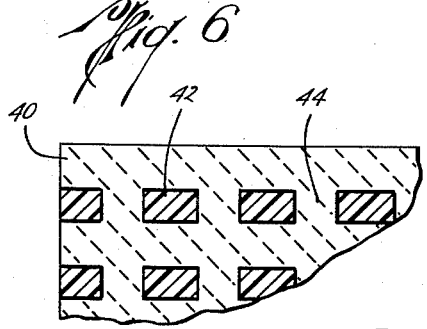
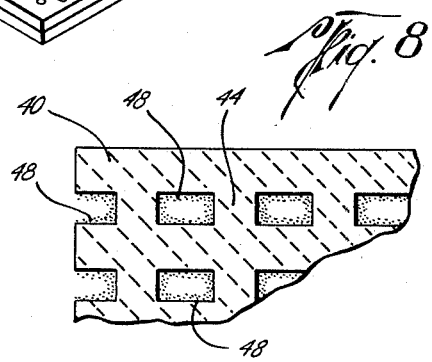
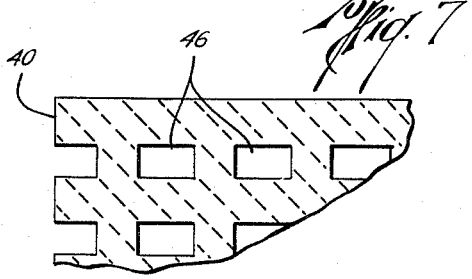
Ralph W. Hippen
INVENTOR.
BY Charles E. Lightfoot
ATTORNEY

3,085,068
METHOD OF RESOLVING EMULSIONS
Ralph W. Hippen, 1520 Welch St., Houston, Tex.
Filed Jan. 22, 1958, Ser. No. 710,509
4 Claims. (Cl. 252—324)

This invention relates to apparatus for resolving or breaking emulsions and more particularly to apparatus through which an emulsion bearing fluid may flow and which operates continuously to separate the phases of the emulsion as the emulsion passes through the apparatus.

While not limited to such use the invention finds particular application in connection with the resolving of water-in-oil emulsions and more especially in the separation of water from the oil which is obtained from oil wells.

In the production of oil from wells it has become a commom practice to employ a system of collection and distribution in which the oil from numerous different wells is fed into a common supply line or storage vessel.

One disadvantage of the use of a system of this kind is that the oil content of the fluid from the same or different wells may vary widely making it difficult to determine the value of the production from each well. The accurate metering of the amount of fluid collected from each well in such a system will not adequately serve as a basis for the determination of the amount of oil to be paid for. The wide variation in the amount of oil contained in the well fluid is due chiefly to the water present in the well fluid and the determination of the oil content of the fluid becomes especially difficult when the fluid contains water-in-oil emulsion due to the fact that the water in the emulsion does not separate out and special equipment or treatment must then be employed to break the emulsion.

Heretofore no satisfactory method has been provided whereby water-in-oil emulsions in well fluids could be effectively resolved and the amount of water in such fluids accurately determined without the continuous sampling of the fluids.

The present invention has for an important object the provision of emulsion resolving apparatus adapted to be inserted in a flow line and which operates continuously to cause the separation of water and oil from a water-in-oil emulsion passing through the apparatus.

Another object of the invention is to provide emulsion resolving apparatus embodying a body or mass of a substance inert to the emulsified materials having numerous small interstices or passageways through which the emulsion may flow, whereby intimate contact between the surface of the body and the particles of the emulsion may be obtained.

A further object of the invention is the provision of an improved contact mass or body of a substance inert to the emulsified materials which is formed with minute passageways or interstices through which the emulsion may flow, and including a treating substance coated on the body in said interstices whereby intimate contact of the particles of the emulsion with the surface of the treating substance is obtained as the emulsion passes through the body.

Another object of the invention is to provide a contact mass or body of a porous character and an improved method of making the same for use in resolving emulsions.

A further object of the invention is the provision of emulsion resolving apparatus which is of simple design and rugged construction, adapted for continuous use, and which is constructed for easy installation in a flow line through which the fluid to be treated passes.

A still further object of the invention is to provide a means for effectively resolving emulsions, and especially emulsions of the water-in-oil type, such as those commonly found in the fluid obtained from producing oil wells, without the necessity of subjecting such fluids to chemical treatment such as the addition thereto of acids or other emulsion breaking chemicals.

The above and other important objects and advantages of the invention may best be understood from the following detailed description, constituting a specification of the same, when considered in conjunction with the annexed drawings, wherein—

FIGURE 1 is a vertical, central, cross-sectional view, on a reduced scale, illustrating a preferred embodiment of the invention;

FIGURE 2 is a cross-sectional view, on a somewhat enlarged scale, taken along the line 2—2 of FIGURE 1, looking in the direction indicated by the arrows;

FIGURE 3 is a perspective view on a somewhat enlarged scale, partly broken away and partly in cross-section, showing the contact mass or body of the invention and its enclosing screen, as illustrated in FIGURE 1, removed from the surrounding structure of the apparatus;

FIGURE 4 is a perspective view, on a somewhat reduced scale, of a somewhat different form of the contact mass or body of the invention;

FIGURE 5 is a perspective view on an enlarged scale showing details of construction of one of the porous ceramic elements of the contact mass or body illustrated in FIGURE 4 and the manner in which the same is made;

FIGURE 6 is a fragmentary, cross-sectional view, on a greatly enlarged scale of a modified form of the contact body or mass made in accordance with the invention, showing the same in an initial stage of manufacture;

FIGURE 7 is a view similar to that of FIGURE 6, showing the contact body or mass in a more advanced stage of manufacture;

FIGURE 8 is a view similar to that of FIGURE 6, showing the contact mass or body in its final stage of manufacture; and FIGURE 9 is a fragmentary view, similar to that of FIGURE 1, illustrating a somewhat modified form of the invention.

Referring now to the drawings in greater detail the invention is illustrated herein, by way of example, in connection with its use in the resolving of water-in-oil emulsions of the kind which are commonly present in well fluids from producing oil wells, it being understood that the invention is capable of more general use in the treatment of emulsions of widely varying character.

As seen in FIGURE 1, the apparatus of the invention comprises a receptacle or casing 10 having an inlet 12 and an outlet 14 adapted to be connected into a flow line and through which oil from a producing oil well or other source may flow.

The receptacle is provided at its upper end with a gas discharge port 16 which may be connected in communication with a trap, discharge valve or other suitable mechanism of normal construction, not shown, to permit the escape of gas which accumulates in the receptacle from the fluid passing therethrough.

Mediate its ends the receptacle is provided with an internal partition or divider 18 defining an upper receiving chamber 20 therein above the partition and a lower separation or settling chamber 22 located below the partition. A lower water discharge outlet 24 is provided leading from the lower portion of the separating or settling chamber through which water which accumulates from the resolved emulsion may be drawn off. The discharge outlet 24 may be provided with a suitable valve, not shown, for controlling the discharge of the water from the settling chamber.

An inner pipe 26 is extended through a central opening in the partition 18, opening downwardly at its lower end into the separating chamber 22 and extending upwardly within the receiving chamber 20. The upwardly extending portion of the pipe 26 in the receiving chamber is closed at its upper end and has perforations 28 suitably spaced apart and preferably uniformly distributed throughout its length.

An outer tubular screen member 30 surrounds the perforated portion of the pipe 26 in radially outwardly spaced relation thereto, which member has a perforated or foraminous wall and is closed at its upper end as shown at 32 and rests at its lower end on the partition 18 which closes the lower end of the screen member. The pipe 26 extends upwardly through a central opening in the upper end 32 of the screen member and is externally threaded at its upper end portion to receive a nut 34 by which the screen member is removably held with its lower end in closing contact with the partition 18. Suitable gaskets or packing elements, such as those shown at 35 and 37, may be positioned between the closure 32 and the upper end of the tubular member 30 and between the lower end of the member 30 and the partition 18, to close the ends of the member against leakage.

Within the screen member 30 a mass 36 of fibrous material such as finely spun glass or mineral wool surrounds the perforated portion of the pipe 26 in position to form a filter-like body having fine interstices through which the fluid which enters the receiving chamber 20 through the inlet 12 may flow to enter the pipe 26 through the perforations 28 and flow downwardly into the separating or settling chamber 22.

The mass 36 is formed of relatively inert, durable and heat resistant material, such as glass or mineral wool which has in its interstices an emulsion resolving substance, such as activated carbon, with which the fluid passing through the mass comes into contact to cause water-in-oil emulsions in the fluid to break or be resolved. The mass 36 may also be formed of suitable particulate material, such as sand or the like, as shown at 54 in FIGURE 9.

The upper end closure 32 of the tubular member 30 may be movably fitted into the upper end of the tubular member, if desired, so that the nut 34 may be used to compress the mass 36, whereby the porosity of the mass may be altered.

When the emulsion resolving substance in the mass 36 is to be activated carbon, the mass may be treated by immersing the mass in a solution of sugar in water, such as a solution containing about 2 pounds of sugar in about one-half gallon of water. After the mass has been thoroughly wetted through with the sugar solution it is dried and then heated to a temperature to char sugar to cause the same to decompose to leave a deposit or coating of activated carbon on the fibers extending into the interstices of the mass. The activated deposit or coating thus formed is insufficient to produce any substantial clogging of the interstices of the mass but is distributed throughout the entire mass in a manner to present a large surface area with which the fluid passing through the mass is brought into intimate contact to cause the breaking or resolution of water-in-oil emulsions in the fluid. The fluid which has passed through the mass flows downwardly into the separating chamber 22 wherein the water separated from the emulsion sinks to the bottom while the oil rises and flows out through the outlet 14. The water in the bottom of the chamber 22 may be drawn off from time to time, or the discharge outlet 24 may be provided with any suitable control mechanism, not shown, whereby the water will be discharged automatically.

In the operation of the apparatus the receptacle 10 is connected into a flow line through which the emulsion containing oil or well fluid is flowing, so that the fluid may enter the receiving chamber 20 through inlet 12 and pass out of the separating chamber 22 through the outlet 14. The fluid in chamber 20 will then pass through the interstices of the mass 36 of mineral wool in intimate contact with the deposit or coating 48 of activated carbon, shown in FIGURE 8, which acts upon any water-in-oil emulsion therein to resolve the emulsion. The fluid thus treated then flows downwardly in the inner pipe 26 into the separating chamber 22 wherein the oil will float on the water which sinks to the bottom of the chamber. The oil then flows out through the outlet 14 into the flowline while the water may be discharged through the outlet 24 as previously described.

By way of example a crude sample of oil containing 20 percent water in the form of a water-in-oil emulsion and 10% of sediment or BS, was passed through the apparatus of the invention using mineral wool as the filter-like mass and carbon as the active material in accordance with the invention as described above and the water and oil from the resolved emulsion was allowed to separate in the separating chamber 22. The clean oil thus obtained was found to be substantially completely free of water and sediment or BS.

A somewhat different form of the filter-like treating body of the invention is illustrated in FIGURES 4 to 8, inclusive, wherein the body or mass is made up of a number of elongated block-like sections 38 of generally rectangular configuration, each of which is made up of layers 40 of a durable, inert material, such as clay or the like, between which layers 42 of thin perforated paper are positioned. The blocks 38 may conveniently be made by assembling strips of perforated paper and moist clay in alternating arrangement in a compact pile to form blocks of desired size and shape which are then dried and fired until the paper is burned out and the layers of ceramic material are vitrified to provide passageways of very small dimensions extending through the width of the blocks. By using paper strips of suitable thickness, the width of the passageways formed may be regulated as desired, and by suitably selecting the size and spacing of the perforations in the paper the dimensions of the passageways may be further determined.

In making the block-like sections the clay of the layers 40 will penetrate and extend through the perforations 44 of the paper layers 42, as seen in FIGURE 6, so that when the blocks are fired the paper will be burned out to leave passageways 46, as best seen in FIGURE 7.

The thus formed block-like bodies are then immersed in a solution of sugar or the like, such as that previously described and again fired to char the sugar and leave a thin deposit 48 of activated carbon coating the interiors of the passageways as illustrated in FIGURE 8, to provide a greatly extended surface area positioned to be contacted by the fluid passing therethrough to cause the breaking or resolving of the emulsions in the fluid.

One way in which the block-like sections, constructed as described above, may be assembled to form the filter-like body of the invention is illustrated in FIGURE 4, wherein the sections 38 are positioned in radially extending arrangement with longitudinal edges of the sections in juxtaposition to form an inner tubular passageway 50 of polygonal shape in cross-section. The sections may be secured together in this relation by suitable cementing material, such as cellulose or other plastic material, as shown at 52, and the end surfaces of the sections may be sealed by coating the same with a similar cementing material.

When thus assembled the sections form a filter-like body having a central tubular passageway and which may be placed in the receptacle 10 and suitably secured therein in surrounding relation to the inside of the screen member 30 and the filter-like mass 36, the inner, tubular passageway 50 being suitably closed at its upper end and opening downwardly at its lower end through the partition 18 into the separating chamber 22. When the filter-like body if thus positioned in the receiving chamber 20, fluid in the chamber may pass through the small passageways 46 into the inner tubular passageway 50 from whence the fluid flows downwardly into the separating chamber 22. During the passage of the fluid through the passageways 46 emulsions in the fluid are brought into intimate contact with the activated carbon 48 which lines the interior of the passageways, causing the emulsions to be broken or resolved so that the water therein may settle out in the separating chamber to be drawn off through the discharge outlet 24.

The dimensions of the passageways 46 may be regulated as desired by selecting paper layers 42 of the required thickness. Paper of a thickness of about 0.003 inch has been found to provide passageways of desirable dimensions for a device used in effectively resolving water-in-oil emulsions of the kind commonly occurring in the oil obtained from producing oil wells. By making the filter-like bodies of sufficient height and formed of a sufficient number of the block-like sections a device can be constructed which permits substantially uninterruped flow of the fluid through the flowline while at the same time ample contact area is provided to effectively resolve the emulsions in the fluid.

As examples of the operation of the invention making use of the filter-like body constructed in accordance with the form illustrated in FIGURES 4 to 8 inclusive, the following results were obtained using actual samples of crude oil obtained from producing wells.

|  | Percent Sediment (BS) | Percent-Water-in-Oil Emulsion |
| --- | --- | --- |
| Raw Sample #1 | 9.0 | 17.0 |
| After treatment | 0.0 | 0.6 |
| Raw Sample #2 | 30.0 | 10.0 |
| After treatment | 0.0 | 0.0 |
| Raw Sample #3 | 21.0 | 14.0 |
| After treatment | 0.0 | 0.2 |
| Raw Sample #4 | 14.0 | 40.0 |
| After treatment | 0.0 | 16.0 |

The percentages of sediment or BS and water in the raw samples and remaining in the samples after the treatment was determined by centrifuging the material before and after treatment. From the above examples it will be apparent that the water-in-oil emulsion in the well fluid may be substantially completely resolved by the use of the invention.

It will be understood, of course, that the apparatus of the invention is susceptible of numerous changes and modifications both as to the arrangement of the various parts and the sizes of the interstices and passageways of the filter-like body and that such changes are contemplated as within the spirit of the invention and the scope of the appended claims.

Having thus clearly shown and described the invention, what is claimed as new and desired to secure by Letters Patent is:

1. The method of making an emulsion resolving body adapted to be positioned in the path of flow of a fluid containing an emulsion and having a passageway therethrough through which the fluid may flow which comprises forming a body of a vitrifiable substance and a combustible material in the body positioned at the location of the passageway, firing the body to cause vitrification of the body and combustion of said material to remove the material and depositing a coating of activated carbon material on the body in said passageway.

2. The method of making an emulsion resolving body adapted to be positioned in the path of flow of a fluid containing an emulsion and having a passageway therethrough through which the fluid may flow which comprises forming a body of a vitrifiable substance and a combustible material in the body positioned at the location of the passageway, firing the body to cause vitrification of said substance and combustion of said material to substantially completely remove the material, applying to the body in the passageway a carbonaceous substance capable of being reduced to form activated carbon and refiring the body to cause the formation of activated carbon in the passageway.

3. The method of making an emulsion resolving body formed of incombustible fibrous material adapted to be positioned in the path of flow of a fluid containing an emulsion and through whose interstices the fluid may flow which comprises applying a carbonaceous substance to the body in the interstices between the fibers thereof and reducing said substance to cause the formation of activated carbon in said interstices.

4. The method of making an emulsion resolving body adapted to be positioned in the path of flow of a fluid containing an emulsion and having passageways of uniform cross-sectional area therethrough, through which the fluid may flow, which comprises forming a body of a vitrifiable substance and a combustible material, said material being positioned to form the passageways when removed by combustion, firing the body to cause vitrification of said substance and combustion of said material to substantially completely remove the material, applying to the body in the passageways a carbonaceous substance capable of being reduced to form activated carbon and refiring the body to cause the formation of a surface coating of activated carbon on the body in the passageways.

References Cited in the file of this patent

UNITED STATES PATENTS

| 197,637 | Johnson et al. | Nov. 27, 1877 |
| 617,079 | Catlett | Jan. 3, 1899 |
| 1,589,532 | Hoodless | June 22, 1926 |
| 1,596,585 | DeGroote | Aug. 17, 1926 |
| 1,822,072 | Wiegand | Sept. 8, 1931 |
| 1,993,955 | Benner et al. | Mar. 12, 1935 |
| 2,036,380 | Wortz | Apr. 7, 1936 |
| 2,198,393 | Smit | Apr. 23, 1940 |
| 2,211,208 | Ipatieff et al. | Aug. 13, 1940 |
| 2,336,482 | Hatfield | Dec. 14, 1943 |
| 2,454,605 | Kirkbride et al. | Nov. 23, 1948 |